Jan. 5, 1960  R. E. KRUEGER  2,919,859
TEMPERATURE CONTROL SYSTEM
Filed Sept. 4, 1956  2 Sheets-Sheet 1

INVENTOR.
RUDOLPH E. KRUEGER
BY
Christie, Parker & Hale
ATTORNEYS

2,919,859
TEMPERATURE CONTROL SYSTEM

Rudolph E. Krueger, Burbank, Calif.

Application September 4, 1956, Serial No. 607,605

8 Claims. (Cl. 236—1)

This invention relates to an improvement in temperature control systems which provides maximum temperature control stability under all conditions, including extreme variations in the temperature of the space, the temperature of which is to be controlled, and extreme variations in the pressure of the source of fluid utilized to control the temperature of the space.

This application is a continuation-in-part of my copending application Serial Number 270,572, filed February 8, 1952, entitled "Anti-Icing Control System," now Patent No. 2,868,483, granted January 13, 1959.

It is customary in temperature control using a fluid supply to attempt to maintain a desired temperature within a particular area by utilizing a temperature sensing means such as a thermostat or thermistor to continuously sense the temperature within the area. Usually, means such as an electrical circuit is included as a part of the system, with the electrical circuit being controlled by the temperature sensing means to cause the movement of a valve located in the fluid supply conduit to control the amount of fluid fed to the confined space.

It is well known that when temperature sensing devices, such as thermocouples, thermostats and hot wires are used in temperature control systems, a time lag exists between the time of change of the temperature in the confined space and the time at which the thermocouple produces a signal in response to the change in temperature within the confined space. In view of this time lag, the corrective action of an electrical system actuated by the thermocouple is not synchronized, or is out of phase with the changes in temperature within the confined space. As a result the valve within the fluid conduit means controlled by the thermocouple will always cause the flow of fluid to the confined space to excessively correct the temperature therein. Thus, the valve will hunt about the proper position necessary to maintain a constant temperature within the confined space.

Attempts have been made to correct this hunting effect by providing in the electrical system a follow-up of a motor or valve position. In utilizing this type of correction means, a potentiometer is usually included in a bridge circuit. A temperature selector or rheostat, which may be adjusted according to the desired temperature, is also included in the bridge circuit. Variation of the temperature within the confined space will unbalance the bridge circuit, causing movement of the valve in the fluid conduit means and also movement of the wiper arm of the follow-up potentiometer. The movement of the stabilizing means or follow-up potentiometer, therefore, is entirely a function of the valve movement. Such a temperature control system, however, will nevertheless allow hunting, because the amount of temperature change within he confined space is also a function of the pressure of the fluid being fed into the confined space to maintain the desired temperature.

In actual practice the pressure of the fluid supply is not constant, but variable. The follow-up type system has no means for applying a correction in response to the variations of pressure of the fluid supply, the position of the follow-up being, as mentioned, entirely controlled by the electrical signals fed by the temperature sensing means in response to sensed changes in temperature within the confined space.

Under many conditions the hunting effect will be objectionable, particularly in those temperature control systems in which the pressure of the fluid supply must necessarily vary over a very large temperature range, and in which the pressures of the fluid supply vary greatly in short periods of time. One example of a temperature control system in which the hunting effect is extreme, using a follow-up type correction, is the temperature control system utilized in airplanes, wherein the source of fluid is derived from the engine compressors. The pressure from the engine compressors varies over a very wide range and the rate of change of pressure may be very great.

I have greatly improved the stability of a temperature control system by including within the system a pressure sensitive unit which anticipates variations in temperature within the confined space, and applies a correction to the valve before the temperature variations occur. By this means the instability caused by the aforementioned time lag is eliminated.

Because the pressure sensitive unit is responsive to variations in pressure within the fluid supply, which variations are sensed by the pressure sensitive unit and a correction to a potentiometer is applied, the hunting due to variations in fluid supply pressure inherent in previous temperature control systems is also eliminated.

Briefly described the foregoing disadvantages are overcome by the provision of a temperature sensing means for sensing the temperature within the confined space, a valve located in the fluid supply conduit for controlling the flow of fluid to the confined space, and a pressure responsive means which is positioned in the system so as to be subjected to the changes in pressure caused by the movement of the valve. Means are provided which are actuated by the temperature sensing means in response to a temperature change, and the valve moved in the proper direction to properly control the flow of fluid into the confined space. This means is deactuated by the pressure responsive means in response to changes in pressure caused by the movement of the valve. The pressure is a function of flow change. My new system, therefore, anticipates the new temperature of the confined space which will occur in response to the quantity of fluid supplied to the confined space.

Even though the quantity of fluid supplied to the confined space is a function of the pressure in the fluid supply system in addition to the position of the valve, the utilization of the pressure sensing means corrects for the extreme variations in pressure which may occur in some temperature control systems such as the temperature control system of an airplane. The primary control, therefore, is not entirely in the temperature sensing means as was formerly the case, but is in the pressure sensitive unit, thus requiring that the temperature sensing means need not be as accurate as formerly.

A new and improved temperature control system is thus provided which system is inherently stable.

Various modifications are shown in the subsequent drawings and detailed description, each of which has a different degree of stability.

A better understanding of the present invention and its advantages may be had upon a reading of the following detailed description when taken in connection with the drawings, in which.

Figure 1:
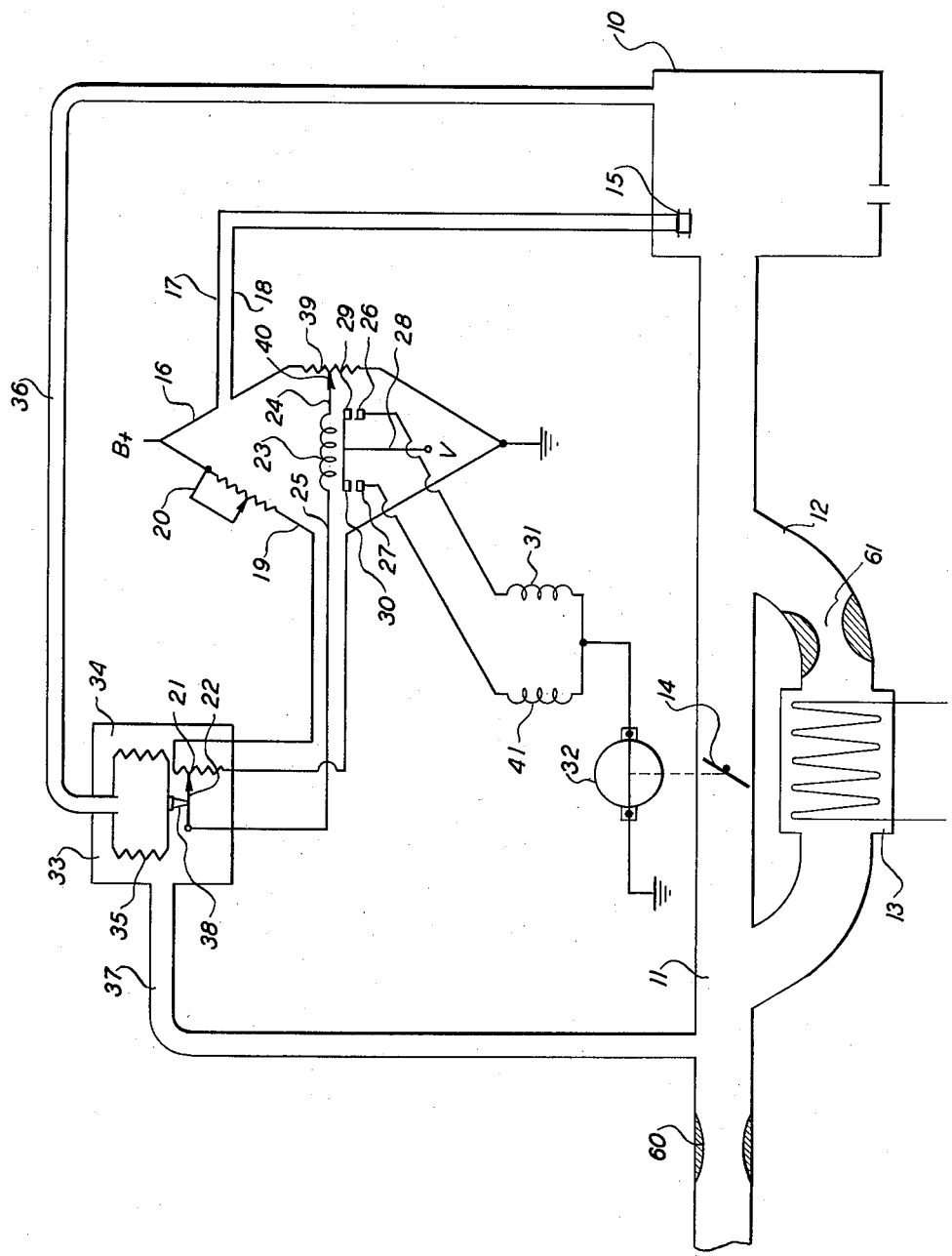
Fig. 1 is a schematic view showing one embodiment of my new temperature control system.

Referring more particularly to Fig. 1, numeral 10 represents a confined space, or a chamber, the temperature of which is to be controlled. The control of the temperature within chamber 10 may be accomplished by conducting into chamber 10 a mixture of warm air and cold air. The warm air is conducted to chamber 10 by means of a fluid conduit 11. The warm air may be supplied by any convenient source of fluid under pressure. When utilized in an airplane temperature control system, the source of fluid supply is the engine compressor. A bypass conduit 12 is provided in the system and includes a means for cooling the air passing through the conduit 12, which cooling means is indicated generally by the numeral 13. A refrigeration turbine may be used as a cooler or any other type of cooling means or heat exchanger. The relative amounts of warm and cooled air are controlled by the position of a valve 14 located in the fluid conduit 11. A restriction 60 is provided to limit the flow of fluid. A restriction 61 is also provided in conduit 12 downstream of the cooling means 13. Hence, a lock pressure is created in response to movement of valve 14.

A temperature sensing means 15 is located within the confined space 10. The temperature sensing means 15 is included in an arm 16 of an electrical bridge circuit through leads 17 and 18. The temperature sensing means shown may be a thermistor which decreases in resistance as the temperature increases.

Arm 16 of the bridge circuit also includes therein a potentiometer 39, the resistance of which is controlled by a contact arm 40. Potentiometer 39 operates as a temperature selector, the desired temperature being controlled by the position of the contact 40 which is manually adjusted. Arm 19 of the bridge circuit includes therein an adjusting potentiometer 20 and a potentiometer 21 having a wiper contact 22. Wipers 40 and 22 are connected to a field coil 23 of a polarized relay by means of leads 24 and 25, respectively. The polarized relay includes stationary flat contacts 26 and 27 and an armature 28 to which are attached movable flat contacts 29 and 30.

As long as the temperature within the confined space 10 remains constant, the potential of the bridge circuit at the contact point of contact 40 will remain the same as the potential of the bridge circuit at the contact point of wiper contact 22, and no current will flow through the field coil 23 of the polarized relay. However, when the temperature sensing means detects a change in temperature in chamber 10, the potential at the contact point of wiper 40 will be changed to a higher or lower potential than the potential of contact 22, depending upon whether the temperature increased or decreased within chamber 10. A current will flow through the field coil 23 from the higher potential to the lower potential, actuating the armature 28 to cause either contact 30 to engage contact 27 or contact 29 to engage contact 26, depending upon the direction of current flow through field coil 23. Current from the potential source V of armature 28 is then conducted to one or the other of the coils 41 and 31 of a servo motor 32. The bridge circuit and servo motor are arranged so that upon an increase in temperature within confined chamber 10, the valve is moved so as to decrease the amount of warm air fed to chamber 10 and, conversely, upon a decrease in temperature within chamber 10, the valve is moved to a position so as to increase the amount of warm air conducted to chamber 10.

To anticipate the temperature changes within confined space 10 according to the position of valve 14 and the pressure of the hot air fluid supply, a pressure sensitive unit 33 is included in the system. The pressure sensitive unit 33 includes a housing 34 in which is positioned a bellows 35. The interior of bellows 35 is subjected to the pressure within the cabin 10 through conduit 36. The exterior of the bellows 35 is subjected to the pressure in the fluid conduit 11 through conduit 37. Bellows 35 therefore acts as a differential pressure bellows, the amount of contraction of the bellows being dependent upon the differential pressure across the bellows.

A stem 38 is connected to the lower portion of the bellows 35 and is always in contact with the wiper arm 22. The wiper arm 22 is variously positioned by stem 38 in response to changes in differential pressure across bellows 35.

In operation, when temperature changes are detected by thermistor 15, the polarized relay is actuated by current flowing through field coil 23 and the valve 14 moved in a direction to alter the supply of warm air to the chamber 10. An increase in temperature effects a closing action of valve 14; a decrease in temperature effects an opening action. The pressure change caused by the movement of the valve 14 is conducted to the housing 33 through conductor 37. The pressure differential across bellows 35 causes a change in position of the stem 38, thereby moving contact 22 to a position to reset the bridge balance currents and stop further motion of valve 14. The changes in temperature within the chamber 10 are a function of the quantity of warm air passed through valve 14, and the quantity of warm air passed through valve 14 is a function of the valve position and the pressure supplied by the pressure source. Hence, this system of temperature control by utilizing a pressure sensitive unit anticipates the change in temperature in chamber 10 before it occurs and applies corrective action to the bridge circuit. The hunting of valve 14 is thereby substantially eliminated.

Figure 2:
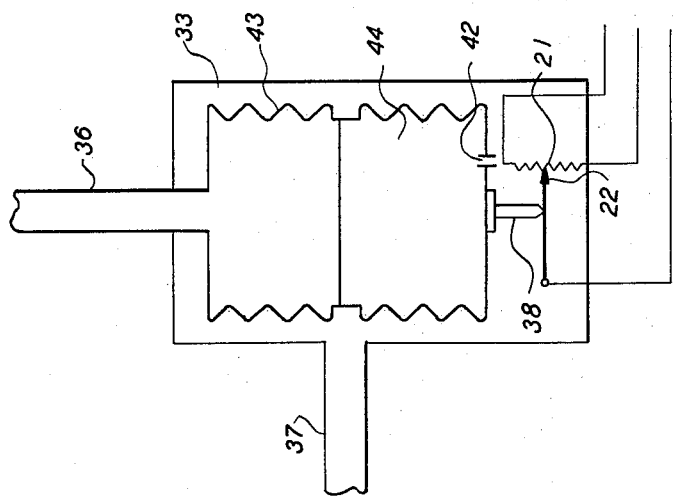
Fig. 2 is a schematic view of a second embodiment of a pressure sensitive unit which may be utilized in my new temperature control system.

Even greater stability control may be obtained by utilizing the pressure sensitive system shown in Fig. 2. In place of the single differential pressure bellows shown in Fig. 1, two bellows 43 and 44 are cooperatively arranged within chamber 33. Bellows 43 is a differential pressure bellows similar to bellows 35 of Fig. 1. Bellows 44 has included therein an orifice 42. If the rate of change of pressure within the pressure conduit 37 is not very great, the interior pressure and exterior pressure of bellows 44 will be equalized, and the corrective effect applied to wiper arm 22 will be entirely under the control of bellows 43. However, if there is a sudden rate of change in pressure within conduit 37, the pressure exterior of bellows 44 will be temporarily greater than the interior pressure. The pressure is equalized as fluid flows through orifice 42. The effect of the sudden rate of change in pressure is to move wiper arm 22 in response to both the rate of change and the actual change, thereby providing a temporary strong stabilizing signal, with the wiper arm 22 being returned to the control of bellows 43 as the interior and exterior pressures of bellows 44 become equalized. By utilizing the pressure sensitive unit shown in Fig. 2, not only is the pressure differential within the fluid conducting means 11 utilized to anticipate the temperature within chamber 10, but also corrections are applied for any temporary variations due to sudden changes in pressure within conduit 11.

Figure 3:
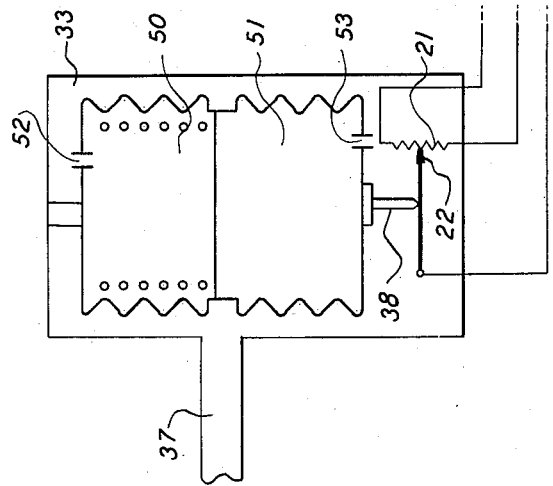
Fig. 3 is a schematic view of still another embodiment of a pressure control unit which may be utilized in my new temperature control system.

The pressure sensitive unit shown in Fig. 3 utilizes two rate of change bellows cooperatively arranged, such as bellows 50 and bellows 51. Orifice 52 is provided within bellows 50 and orifice 53 provided within bellows 51. The rate of change bellows 50 may be calibrated to sweep 80% to 100% of the potentiometer 21 with a pressure differential equal to the maximum operating pressure differential within conduit 11. The calibrated orifice 52 may be sized to cause the required deflection, at a rate of pressure change, say two pounds per square inch per second. Bellows 51 may be calibrated to sweep 80% to 100% of the potentiometer 21 with a pressure differential of approximately 10% of the maximum operating pressure differential. The orifice 53 may be sized to cause the required deflection at a rate of pressure change, say ten pounds per square inch per second.

This type of control is applicable to any system where quantity of fluid flow is used to maintain desired temperature.

I claim:

1. In a temperature control system in which air conditioning of a confined space is accomplished by means of a varying flow of fluid into the confined space, temperature sensing means for sensing the temperature within the confined space, a valve for controlling the flow of fluid, pressure responsive means subjected to changes in pressure drop of the fluid, across the valve, and means actuated by the temperature sensing means in response to a temperature change for controlling the valve and varying fluid flow therethrough to compensate for said temperature change, said last named means being oppositely actuated by the pressure responsive means in response to the corresponding change in pressure drop across the valve.

2. In a temperature control system in which air conditioning of a confined space is accomplished by means of a varying flow of fluid into the confined space, temperature sensing means for sensing the temperature within the confined space, a valve for controlling the flow of fluid, pressure responsive means subjected to changes in pressure drop of the fluid across the valve, and electrical means actuated by the temperature sensing means in response to a temperature change for controlling the valve and varying fluid flow therethrough to compensate for said temperature change, the electrical means being oppositely actuated by the pressure responsive means in response to the corresponding change in pressure drop across the valve.

3. In a temperature control system in which air conditioning of a confined space is accomplished by means of a varying flow of fluid into the confined space, temperature sensing means for sensing the temperature within the confined space, means for conducting fluid into the confined space, a motor controlled valve for controlling the flow of fluid, a pressure responsive unit pneumatically connected to the fluid conducting means, means for moving the motor controlled valve in response to temperature changes in the confined space in a direction to restore the temperature, thereby changing the pressure drop across the valve, and changing the pressures in the fluid conducting means, and means actuated by the pressure responsive unit in response to said change in pressure for moving the motor controlled valve in the direction opposite to the movement of said valve responsive to said temperature changes.

4. In a temperature control system in which air conditioning of a confined space is accomplished by means of a fluid subjected to widely varying pressures at its source, means for conducting the fluid to the confined space, a valve located in the conducting means between the source of fluid and the confined space, a valve actuating means, an electrical circuit including switching means for controlling the operation of the valve actuating means, electrothermal means located within the confined space and forming part of the electrical circuit, and serving to control the movement of the switching means in response to temperature changes within the confined space, thus causing movement of the valve in the proper direction to correct the temperature changes, a pressure sensitive unit responsive to a flow-varying pressure drop change across the valve and pneumatically connected to the fluid conducting means at a point between the source of fluid and the valve, and means included in the electrical circuit and controlled by the pressure sensitive unit for moving the switching means to a position to move the valve in a direction opposite to the movement of said valve responsive to said temperature change.

5. A temperature control system in accordance with claim 4 wherein the pressure sensitive unit includes a bellows, the interior of which is subjected to the pressure within the confined space, and the exterior of which is subjected to the pressure within the fluid conducting means.

6. A temperature control system in accordance with claim 4 wherein the pressure sensitive unit includes a pair of bellows cooperatively arranged with one bellows being responsive to the difference in pressure of the fluid in the fluid conducting means when compared to the pressure of the fluid in the confined space and the other bellows being responsive to the rate of change of pressure in the fluid conducting means.

7. A temperature control system in accordance with claim 4 wherein the pressure sensitive unit includes a pair of bellows cooperatively arranged and each responsive to the rate of change in pressure of the fluid in the fluid conducting means, the sensitivity of one being different from that of the other.

8. In a temperature control system in which air conditioning of a confined space is accomplished by means of a varying flow of fluid, means defining a confined space the temperature of which is to be controlled, a temperature sensing means disposed within the confined space for sensing deviations in the temperature from a desired value, means including a flow throttling valve for supplying fluid to said confined space, a bridge circuit for controlling the valve, the temperature sensing means being connected to the bridge circuit so that changes in temperature in the confined space effects an unbalance in the bridge circuit, a pressure sensitive unit connected pneumatically to the fluid supply means to respond to pressure drop changes across the valve caused by changes in fluid flow occasioned by positional changes of the throttling valve responsive to operation of the temperature sensing means, and a rheostat variously positioned by deflections of said pressure sensitive unit to balance the bridge circuit in advance of the return of the temperature to the desired value.

References Cited in the file of this patent

UNITED STATES PATENTS

| 2,219,147 | Binder et al. | Oct. 22, 1940 |
| 2,250,946 | Brown | July 29, 1941 |
| 2,353,201 | Talbot | July 11, 1944 |
| 2,412,071 | Warner | Dec. 3, 1946 |
| 2,425,000 | Paget | Aug. 5, 1947 |
| 2,474,441 | Sparrow | June 28, 1949 |
| 2,587,815 | Branson | Mar. 4, 1952 |